United States Patent
Tomlinson, Jr. et al.

(10) Patent No.: US 6,411,678 B1
(45) Date of Patent: Jun. 25, 2002

(54) INTERNET BASED REMOTE DIAGNOSTIC SYSTEM

(75) Inventors: Harold Woodruff Tomlinson, Jr., Scotia; Michael James Hartman, Clifton Park; Robert James Mitchell, Jr., Waterford, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/409,893

(22) Filed: Oct. 1, 1999

(51) Int. Cl.[7] ............................. H04M 1/24; H04M 3/08; H04M 3/22
(52) U.S. Cl. ....................... 379/1.01; 702/179; 702/183; 702/188; 714/26; 714/27
(58) Field of Search ............................. 379/1, 14, 27, 379/28, 29, 32, 34, 10, 15; 714/25, 26, 27; 702/179, 182, 183, 184, 188, 189

(56) References Cited

U.S. PATENT DOCUMENTS

| | | | |
|---|---|---|---|
| 4,517,468 A | | 5/1985 | Kemper et al. ................ 290/52 |
| 4,972,453 A | * | 11/1990 | Daniel, III et al. ........... 379/10 |
| 5,657,245 A | * | 8/1997 | Hecht et al. ................. 364/505 |
| 5,946,373 A | * | 8/1999 | Harris ........................ 379/26 |
| 5,978,457 A | * | 11/1999 | Feuerstein et al. ........... 379/142 |
| 6,014,612 A | * | 1/2000 | Larson et al. ................ 702/183 |
| 6,026,352 A | * | 2/2000 | Burns et al. ................. 702/182 |
| 6,145,096 A | * | 11/2000 | Bereiter et al. .............. 714/25 |
| 6,208,266 B1 | * | 3/2001 | Lyons et al. ................. 340/870.02 |

* cited by examiner

*Primary Examiner*—Binh Tieu
(74) *Attorney, Agent, or Firm*—John F. Thompson; Jill M. Breedlove

(57) ABSTRACT

Public or private remote access infrastructures in a communication system are used to facilitate communications between a remote site and a centrally located diagnostic center using only local telephone calls. The diagnostic center as well as one or more remote sites at which monitored equipment is located are coupled to a wide area network (WAN). When data are to be transferred from a remote site to the central diagnostic center, the remote site initiates a local telephone call to a point-of-presence (POP) server on the WAN backbone. This could be an Internet Service Provider (ISP) if the Internet is used, or an intranet if a private network is used. Data are then transferred to the POP server. To complete the transfer, the diagnostic center retrieves the data from the POP server using the public or private wide-area network (the Internet or intranet). The data transfer can be performed either on a scheduled basis, or when an alarm condition is detected at the remote site. The central diagnostic center can use a wireless paging service to prompt the remote site to couple to the POP server.

12 Claims, 2 Drawing Sheets

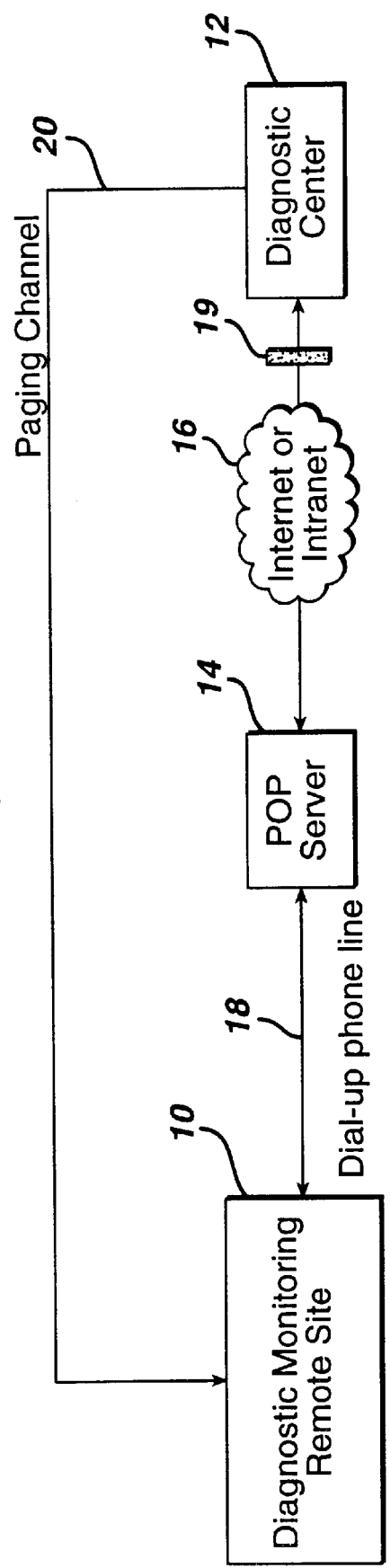

INTERNET BASED REMOTE DIAGNOSTIC SYSTEM

BACKGROUND OF THE INVENTION

1. Technical Field

This invention relates to communications between a diagnostic center and a remote site and, more particularly, to communications between a central diagnostic center and a remote monitoring site using only local telephone calls, thereby avoiding long-distance telephone charges.

2. Background Art

The ability to transfer data from a remote site to a central diagnostic center is an important and often indispensable function. There is a wide area of applications which require transfer of data from a remote site to be uploaded to a diagnostic center. For example, in the field of electric generation, diagnostic surveillance is often performed on the rotor of a turbine-generator set to detect the occurrence, location, and depth of cracks. Early diagnosis can prevent a catastrophic failure which may involve property damage and even personal injury, and can cause considerable electric generation down time. Similarly, in the aeronautic field, stresses on aircraft structures and engine parts are routinely monitored to detect defects and identify potential problem areas to predict possible failures before they occur. In the field of manufacturing, industrial controllers are routinely monitored to detect malfunctions. Suffice it to say, there are many applications which rely on diagnostic monitoring. In addition, for any given application there are usually many different remote sites to be monitored. Rather than have many different diagnostic stations, it is often more feasible that the diagnosing functions be controlled from a central diagnostic center, often located geographically far from the remote monitoring sites.

Communication systems for remote diagnostics presently transfer data via telephone lines. Therefore, a long distance telephone call is required from the remote site to the diagnostic center, or vice-versa from the diagnostic center to the remote site. This arrangement is quite costly, given the long distance telephone fees involved.

SUMMARY OF THE INVENTION

A particular need exists to provide a communication link between a remote site and a central diagnostic center which avoids long distance telephone services and the fees associated therewith.

In a preferred embodiment of the invention, a communication system is provided which uses public or private remote access infrastructure to facilitate wide-area communications between the remote site and the diagnostic center and which requires only local telephone calls. The diagnostic center and one or more remote sites at which monitored equipment is located are coupled to a wide area network (WAN). When data are to be transferred from a remote site to the central diagnostic center, the remote site initiates a local telephone call to a point-of-presence (POP) server on the WAN backbone. This could be an Internet Service Provider (ISP) in the case of the Internet, or an intranet POP server in the case of a private network. Data are then transferred to a computer in the POP server or anywhere on the network, as long as it is outside the so-called "firewall" electronically isolating the diagnostic center from unwanted communications. To complete the transfer, the diagnostic center transfers the data from the POP server to the diagnostic center via the public or private wide-area network (the Internet or an intranet). The data transfer can take place either on a scheduled basis, or when an alarm condition is detected at the remote site. The central diagnostic center can prompt the remote site to connect to the POP server via a wireless paging service or a direct dial phone call.

BRIEF DESCRIPTION OF THE DRAWINGS

FIG. 2 is a block diagram illustrating a paging function in which the central diagnostic center prompts the remote site to connect using only local telephone calls.

DETAILED DESCRIPTION OF THE INVENTION

Figure 1:
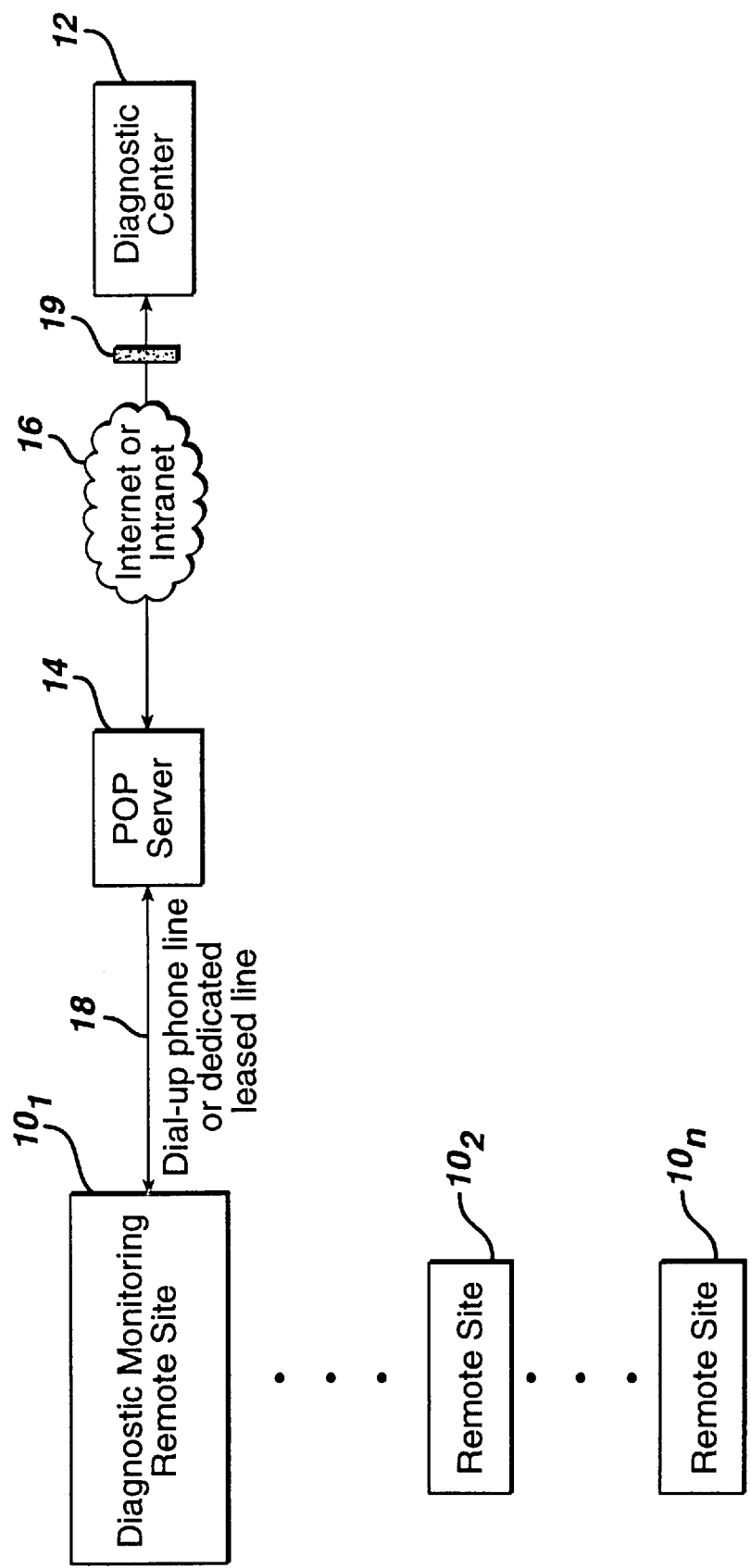
FIG. 1 is block diagram illustrating a communication link between a remote site and a central diagnostic center using only local telephone calls.

FIG. 1 shows a communication link between a remote site 10 and a central diagnostic center 12 according to a preferred embodiment of the invention. While the following discussion refers to just one remote site 10 for illustrative purposes, in practice there can be a plurality of remote sites 101–10n, each of which may be located anywhere and all of which must transfer data to the central diagnostic center. When data from the remote site 10 are to be transferred to the diagnostic center 12, the remote site 10 makes a local telephone call via a local line or dedicated line 18 to a point-of-presence (POP) server 14 of a WAN backbone 16. Of course the connection between the remote site 10 could alternatively be initiated via a digital subscriber loop (DSL) connection, integrated service digital network (ISDN) connection, cable modem connection, or any other suitable medium. WAN 16 can be an Internet Service Provider (ISP) if the Internet is used, or an intranet server if a private or proprietary network is used. Data are then transferred to a computer in POP server 14 or another server on the WAN that is protected by the diagnostic center firewall 19. To complete the transfer, diagnostic center 12 requests transfer of the data from POP server 14 to the diagnostic center 12 using the public or private wide-area network (the Internet or intranet) 16. The data transfer can take place either on a scheduled basis, or when an alarm condition is detected at the remote site. A third option is to transfer data from the remote site to POP server 14 when the amount of data collected at the remote site exceeds a certain quantity. Data to be transferred from diagnostic center 12 to remote site 10 are sent from the diagnostic center 12 to POP server 14, and picked up by remote site 10 after the remote site/POP server connection has been made. Alternatively, a direct Internet connection back to the diagnostic center 12 can be made through firewall 19, a proxy, or similar secure system.

A second mode of operation is possible. If the POP server 14 is provided with call out capabilities, then the POP server 14 can place the local phone call to the remote site 10 when data traffic is to be routed between the diagnostic center 12 and the remote site 10. All of the telephone calls made in these configurations are local calls.

FIG. 2 shows a second preferred embodiment of the invention. In this configuration, a paging system 20 is used to signal remote site 10 that diagnostic center 12 seeks to make a connection to remote site 10. The remote site 10 then initiates a call to POP server 14 via the local line 18, and the remote site 10 and diagnostic center 12 connect, either directly, or through a Virtual Private Network (VPN). A VPN allows a private connection to be made on the public infrastructure (Internet) by using public key authentication and data encryption between the computers. The paging system 20 is needed because most POP servers 14 do not provide call-out capability. The paging system 20 can either be a wireless paging network, or a long distance telephone connection to the site. Even though a long distance call is made for the page, costs are reduced since the actual data connection is still made via a local phone call. This also improves data security at the remote site since a remote site connection is made only when the remote site calls the POP server. Anyone trying to call the remote site to obtain data will be prevented from obtaining a connection.

For example, if remote site 10 is monitoring a turbine generator, data obtained from vibration sensors may be sent to the POP server 14 twelve times a day. Diagnostic center 12 retrieves these data from the POP server 14 to search for trends in the data that indicate a turbine failure might occur over the next twenty-four hours. If vibration data at the remote site 10 indicate that vibration energy exceeds a preset threshold, an alarm signal is sent to the POP server 14 from the remote site 10. Diagnostic center 12 continuously monitors the POP data to look for an alarm signal, and alerts the responsible individuals when the alarm signal is detected. Occasionally, perhaps monthly, the diagnostic center 12 may initiate a connection to a remote site 10 to maintain the database in the remote site 10, or to change the data, or to download schedule or sensor thresholds. To do this the diagnostic center 12 pages the remote site, or places a telephone call to the remote site 10 to initiate a "call-back" from the remote site 10 to the POP server 14. A virtual private network (VPN) can then be established between the diagnostic center 12 and the remote site 10.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A remote diagnostic communication system comprising:
    a centrally located diagnostic center;
    a point-of-presence (POP) server located on a network coupled to said centrally located diagnostic center;
    at least one remote site for collecting diagnostic data and for initiating a local connection to said POP server to transfer said diagnostic data to said POP server so that said diagnostic data can then be retrieved from said POP server by said centrally located diagnostic center; and
    a paging channel between said centrally located diagnostic center and said at least one remote site for prompting said at least one remote site to initiate said local connection to said POP server.

2. A remote diagnostic communication system as recited in claim 1, wherein said local connection comprises one of the group consisting of a dial-up telephone line, a digital subscriber loop (DSL) connection, an integrated service digital network (ISDN) connection, and a cable modem connection.

3. A remote diagnostic communication system as recited in claim 1, wherein said network comprises the Internet.

4. A remote diagnostic communication system as recited in claim 1, wherein said network comprises a private intranet.

5. A remote diagnostic communication system comprising:
    a centrally located diagnostic center;
    a point-of-presence (POP) server located on a network coupled to said centrally located diagnostic center;
    at least one remote site for collecting diagnostic data and for initiating a local connection to said POP server to transfer said diagnostic data to said POP server so that said diagnostic data can then be retrieved from said POP server by said centrally located diagnostic center wherein said local connection comprises a dedicated telephone line; and
    a paging channel between said centrally located diagnostic center and said at least one remote site for prompting said at least one remote site to initiate said local connection to said POP server.

6. A method for communicating diagnostic data between a remote site and a central diagnostic center while avoiding use of long distance telephone services, the method comprising the steps of:
    coupling a centrally located diagnostic center to a network;
    placing at least one remote diagnostic monitoring station at a remote site for collecting diagnostic data at said remote site;
    initiating a local coupling between said at least one remote diagnostic monitoring station and a point-of-presence (POP) server on said network;
    transferring said diagnostic data from said at least one remote diagnostic monitoring station to said POP server for retrieval therefrom by said centrally located diagnostic center; and
    initiating a page from said centrally located diagnostic center to said at least one remote diagnostic monitoring station for prompting said at least one remote diagnostic monitoring station to couple to said POP server wherein the step of initiating a local coupling is performed by said at least one remote diagnostic monitoring station.

7. A method for communicating diagnostic data between a remote site and a central diagnostic center while avoiding use of long distance telephone services, the method comprising the steps of:
    coupling a centrally located diagnostic center to a network;
    placing at least one remote diagnostic monitoring station at a remote site for collecting diagnostic data at said remote site;
    initiating a local coupling between said at least one remote diagnostic monitoring station and a point-of-presence (POP) server on said network;
    transferring said diagnostic data from said at least one remote diagnostic monitoring station to said POP server for retrieval therefrom by said centrally located diagnostic center; and
    initiating a page from said centrally located diagnostic center to said at least one remote diagnostic monitoring station for prompting said at least one remote diagnostic monitoring station to couple to said POP server.

8. A method for communicating diagnostic data between a remote site and a central diagnostic center while avoiding use of long distance telephone services as recited in claim 7 wherein the step of initiating a local coupling comprises dialing a local telephone call to said POP server.

9. A method for communicating diagnostic data between a remote site and a central diagnostic center while avoiding use of long distance telephone services as recited in claim 7 wherein the step of initiating a local coupling comprises communicating to said point-of presence server via a dedicated line.

10. A method for communicating diagnostic data between a remote site and a central diagnostic center while avoiding use of long distance telephone services as recited in claim 7, further comprising the step of initiating a local coupling between said POP server and said at least one remote diagnostic monitoring station when diagnostic data are to be routed between said centrally located diagnostic monitoring center and said at least one remote diagnostic monitoring station.

11. A method for communicating diagnostic data between a remote site and a central diagnostic center while avoiding use of long distance telephone services of claim 10, wherein the step of initiating a local coupling is performed by said at least one remote diagnostic monitoring station.

12. A method for communicating diagnostic data between a remote site and a central diagnostic center while avoiding use of long distance telephone services as recited in claim 7, wherein the step of initiating a local coupling is performed when an amount of data at said remote site exceeds a threshold.

* * * * *